3,816,437
THIENO[2,3-g]INDAZOLES
William J. Houlihan, Mountain Lakes, N.J., assignor to Sandoz-Wander, Inc., Hanover, N.J.
No Drawing. Filed Dec. 22, 1972, Ser. No. 317,519
Int. Cl. C07d 31/50
U.S. Cl. 260—294.8 B    4 Claims

ABSTRACT OF THE DISCLOSURE

Substituted 4,5-dihydro-2H-furano and thieno indazoles, e.g., 4,5 - dihydro-3-(4-pyridyl)-2H-thieno[2,3-g]indazole are useful as nonestrogenic anti-fertility agents.

---

This invention relates to indazole derivatives. More particularly it relates to 3-phenyl and 3-pyridyl derivatives of 4,5-dihydro-2H-furano and thieno [2,3-g] indazoles and their use in pharmaceutical compositions.

The compounds of this invention may be represented by the following formula:

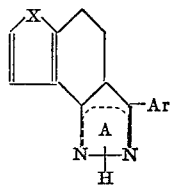

(I)

where
X is O or S and
Ar is

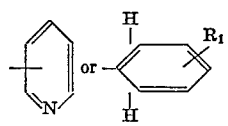

where $R_1$ represents halo having an atomic weight of about 19 to 36 and pharmaceutically acceptable acid addition salts thereof.

The diazo ring (A) in the compounds of formula (I) can have the following structures:

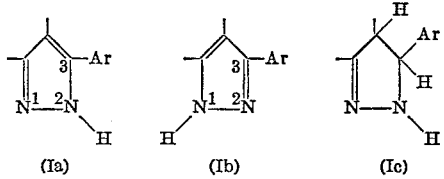

(Ia)          (Ib)          (Ic)

It should be noted that the compounds of structures (Ia) and (Ib) are considered equivalent and are known to exist in both tautomeric forms. It should also be noted that this invention includes the geometrical and optical isomers of the compounds of structures (Ic).

The compounds of formula (I) in which ring A has the structure (Ia) and (Ib) may be prepared by the following reaction scheme:

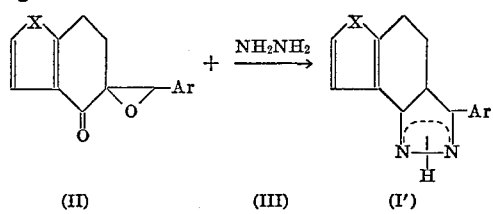

(II)          (III)         (I')

where X and Ar are as defined above.

The compounds of formula (I') are prepared by treating a compound of formula (II) with hydrazine of formula (III). The reaction is preferably carried out under acidic catalysis which can be provided by a mineral acid such as hydrochloric acid, sulfuric acid, and the like, an organic acid such as acetic acid, p-toluenesulfonic acid or a Lewis acid such as boron trifluoride. The preferred acid is acetic acid. Although a solvent is not required, it is preferred that the reaction be carried out in the presence of an inert solvent such as the lower alkanols, i.e.; alkanols having 1 to 4 carbon atoms, aliphatic or aromatic hydrocarbons, straight chain ethers or cyclic ethers. The particular solvent used is not critical, but the lower alkanols such as methanol, ethanol, butanol and the like are preferred. The temperature of the reaction also is not critical, but it is generally carried out between 35 to 200° C. preferably at the reflux temperature of the system. It is also preferred that the reaction be run for from 8 hours to 5 days. The product is recovered in the usual manner, e.g., by evaporation and crystallization.

The compounds of formula (Ic) can be prepared by the following reaction scheme:

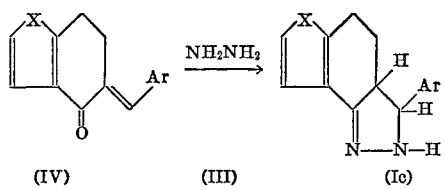

(IV)         (III)         (Ic)

where X and Ar are as set out above.

The compounds of formula (Ic) are prepared by treating a compound of formula (IV) with hydrazine of formual (III). Although a solvent is not necessary, it is preferred that the reaction be carried out in an inert solvent such as lower alkanols, aliphatic or aromatic hydrocarbons, halogenated hydrocarbons, straight chain ethers or cyclic ethers. The particular solvent used is not critical but the preferred solvents are the lower alkanols such as methanol, ethanol, butanol and the like. The temperature of the reaction is not critical, but it is normally carried out between 35° and 150° C. preferably at the reflux temperature of the system. It is also preferred that the reaction be run for from 8 hours to 5 days under anhydrous conditions. When the preceding reaction is carried out in an inert atmosphere, such as helium, argon or nitrogen, the compound with structure (Ic) is predominantly obtained and is isolated by conventional techniques.

The compounds of formulas (Ia) and (Ib) can be prepared by the following reaction from the compounds of formula (Ic):

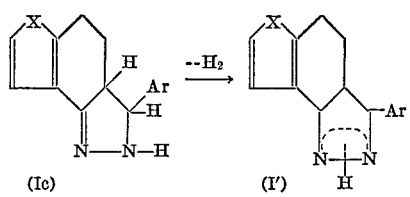

(Ic)                  (I')

where X and Ar are as set out above.

The compound of formula (I') is prepared by dehydrogenating a compound of formula (Ic). The dehydrogenation can be carried out by exposing compound (Ic) to air or oxygen for example on a chromatographic media such as silica or alumina. Alternately, the reaction may be carried out in the presence of a dehydrogenating agent such as sulfur or palladium or an oxidizing agent such as manganese dioxide. Although a solvent is not essential in the reaction and the temperature is not critical, it is preferred that an inert solvent be used and that the reaction be carried out between temperatures of 20 to 250° C.

When sulfur or palladium is used as the dehydrogenation agent, the preferred solvents are Decalin, xylene, naphthalene and the like and the preferred temperature is 200 to 250° C. With manganese dioxide, the preferred solvent is benzene, toluene and the like and the preferred temperature is 20 to 50° C. It is also preferred that the reaction be run for 5 to 50 hours, especially from 5 to 25 hours. The products are recovered by conventional techniques, e.g., evaporation and recrystallization.

The compounds of formulas (Ia) and (Ib) may also be prepared by the following reaction scheme:

The compounds of formulas (Ia) and (Ib) may also be prepared by the following reaction scheme:

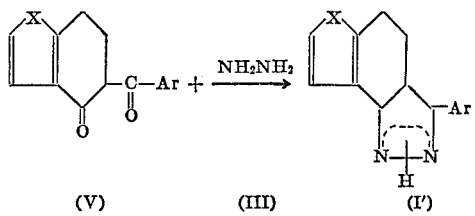

where X and Ar are as set out above.

The compounds of formula (I') are prepared by treating a compound of the formula (V) with hydrazine of the formula (III). Although a solvent is not necessary, it is preferred that the reaction be carried out in an inert solvent such as the lower alkanols, e.g., methanol, ethanol, and the like, ethers, e.g., diethyl ether, dioxane or tetrahydrofuran, halogenated hydrocarbons such as chloroform, or in excess hydrazine of formula (III). The temperature of the reaction is not critical, but the reaction is preferably run at between 30° to 150° C., especially at the reflux temperature of the reaction mixture. The product is isolated by standard techniques, e.g., recrystallization.

The compounds of formula (II) are prepared in accordance with the following reaction scheme:

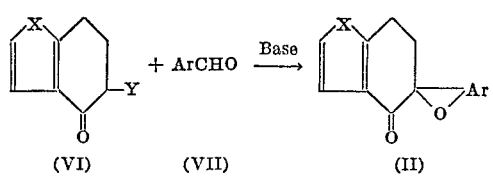

where

Y is a leaving group and
X and Ar are as set out above.

The compounds of formula (II) are prepared by treating a compound of formula (VI) with a compound of formula (VII) under basic conditions in an inert solvent. It is preferred that the reaction be run in an inert atmosphere such as argon, helium and especially nitrogen. The leaving group Y in formula (V) can be any of the conventional leaving groups employed in such a reaction, such as chlorine, bromine, iodine, tosylate, mesylate and the like. The preferred leaving group is the halogens, especially chlorine or bromine. The basic conditions for the reaction are provided by alkali or alkali earth metal hydroxides, alkali metal lower alkoxides, tertiary aliphatic and aromatic amines and tertiary cyclic amines such as pyridine and the like. Although the particular solvent used is not critical, the lower alkanols such as methanol, ethanol, butanol, and the like are especially preferred, in particular the lower alkanol corresponding to the alkali metal alkoxide when used. The temperature of the reaction is not critical, but it is generally carried out between 0° and 30° C., preferably about 0° to 10° C. Although the time is not critical, it is preferred that the reaction be run for from 1 to 15 hours. The product is recovered by standard techniques e.g., by crystallization or distillation.

The compounds of formula (II) can also be prepared by the following reaction scheme:

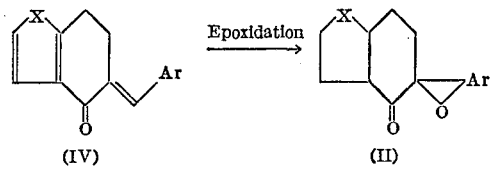

where X and Ar are as set out above.

The compounds of formula (II) are prepared by treating the compounds of formula (IV) with an epoxidizing agent in an inert solvent. The epoxing agent used can be any of the standard epoxidizing agents used in epoxidizing α,b-unsaturated ketones, e.g., hydrogen peroxide and bases such as the alkali metal hydroxides or alkoxides. The inert solvent can be water, lower alkanols, aliphatic or aromatic hydrocarbons, halogenated hydrocarbons, straight chain ethers, cyclic ethers, and the like depending on the solubility characteristics of the reactants, in particular, the epoxidizing agents. The preferred solvents are water and the lower alkanols such as methanol, ethanol, butanol, and the like. The temperature of the reaction is not critical, but it is normally carried out between 0° and 100° C., depending on the epoxidizing agent but preferably between 15° to 30° C. For optimum results it is preferred that the reaction be run from 3 hours to 2 days preferably 5 to 10 hours. The product is recovered in the usual manner e.g., by extraction and evaporation.

The compounds of formulas (IV), and (VI) are prepared by well known procedures from compounds of the formula:

where X is as set out above.

The compounds of formula (IV) are, for example, prepared by treating a compound of formula (VIII) with a compound of formula (VII). The process is suitably carried out by standard techniques, preferably in an inert solvent such as piperidine, and in the presence of a catalytic amount of a base such as sodium hydroxide, potassium hydroxide, diethylamine or triethylamine or in the presence of a catalytic amount of an acid such as hydrochloric acid, sulfuric acid, phosphoric acid, acetic acid, toluenesulfonic acid or methylsulfonic acid. The temperature of the reaction is 15 to 100°, and the reaction is run for from 2 to 24 hours. The particular solvent, temperature or time used in the reaction is not critical.

The compounds of formula (VI) may be obtained by standard procedure from compounds of formula (VIII). For example, the chlorine or bromine substituted compounds can be prepared by treating the compound of formula (VIII) with chlorine or bromine, preferably in an inert solvent such as acetic acid, chloroform or carbon tetrachloride. The reaction can be carried out at temperatures from room temperature to 50° over a period of 1 to 12 hours. The particular solvent, temperature or time used in the reaction are not critical.

The tosylate and mesylate can be prepared from the chlorine or bromine substituted compound by treatment with a tosylate or mesylate salt, such as sodium or potassium tosylate or mesylate in an inert solvent such as lower alcohols, toluene or benzene. The reaction is preferably carried out at temperatures between 15 to 70° especially between 25 to 40° for a period of 2 to 10 hours, preferably 4 to 7 hours. The particular solvent used, the temperature and the time of the reaction are not critical.

The hydrazine of formula (III) and many of the compounds of formulas (V), (VII) and (VIII) are known and are prepared by procedures disclosed in the literature. The compounds of formulas (V), (VII) and (VIII) not specifically disclosed in the literature may be prepared by analgous methods using known starting materials.

The compounds of formula (I), in particular the compounds having structures (Ia) and (Ib), are useful as anti-fertility agents as indicated by their activity in female Wistar rats which are injected daily with 2 mg. of the test compound for eight successive days starting on the day of vaginal cornification. At the time of the 4th injection, males of known fertility are cohabitated with the females (one female with one male) until the end of the treatment period. The males are separated from the females 24 hours following the last injection. The females are sacrificed six days later, and examined for the presence of absence of implantation sites.

The use of the compounds as anti-fertility agents is further indicated by their luteolytic properties which results in the compounds being abortifacient agents. The luteolytic activity is determined using pseudopregnant rabbits treated with corn oil or compound (1–100 mg. per day) suspended in corn oil on days 3 through 8 of pseudopregnancy. Blood samples are obtained daily throughout the length of pesudopregnancy. Plasma samples are analyzed for progestin content according to the method of Johansson et al. (Endocrinology, 82, 143, 1968). The compound is judged active if plasma progestin levels are similar to pretreatment values on day 12 of pseudopregnancy.

Abortifacient activity is also determined in female proestrous rats (Royal Hart, Wistar strain) selected from a colony and caged with fertile males. On the following day pregnancy is confirmed by the presence of sepermatozoa in the vaginal smear. On the seventh day following mating, the females are treated with 1 to 30 milligrams of the compound to be tested. The animals are injected daily for a total of seven days; and on the eighth day following the first injection the animals are killed and the uterus checked for the presence of absence of implantation sites.

The compounds of formula (I) exhibit none of the estrogenic effects and side effects exhibited by the steroidal type compounds when used as anti-fertility agents.

When the compounds are employed for the above utility, they may be combined with one or more pharmaceutically acceptable carriers or adjuvants, and may be administered orally in such forms as tablets, capsules, elixirs, suspensions and the like, bucally or sub-lingually as a tablet, parenterally in the form of an injectable solution or suspension or in special forms such as suppositories and the like especially pessaries. Depending upon the compound employed and the mode of administration, the exact dosage utilized may vary.

Furthermore, the compounds of formula (I) may be similarly administered in the form of their non-toxic pharmaceutically accpetable acid addition salts. Such salts possess the same order of activity as the free base, are readily prepared by reacting the base with an appropriate acid and accordingly, are included within the scope of the invention. Representative of the acid addition salts are the mineral acid salts, such as the hydrochloride, hydrobromide, sulfate, phosphate and the like and the organic acid salts, such as the succinate, benzoate, acetate, p-toluenesulfonate, benzenesulfonate, and the like.

In general, satisfactory results are obtained when the compounds of formula (I) are administered as anti-fertility agents at a daily dosage of about 1.0 milligrams to about 200 milligrams orally or subcutaneously per kilogram of animal body weight. This daily dosage is preferably administered 1 to 4 times a day or in sustained release form. For most large mammals, such as primates, the total daily dosage is from about 1 milligram to about 1 gram. Dosage forms suitable for internal use comprise from about 0.25 milligrams to about 0.5 grams of the active compound in intimate admixture with a solid or liquid pharmaceutically acceptable carrier or diluent.

A representative formulation suitable for oral administration 2 to 4 times a day in fertility control is a capsule prepared by standard encapsulating techniques which contain the following:

| Ingredients: | Weight (mg.) |
|---|---|
| 4,5 - dihydro - 3 - (4-pyridyl)-2H-thieno[2,3-g]indazole | 25 |
| Inert solid diluent (starch, indazole, lactose, kaolin | 275 |

EXAMPLE 1

4,5-dihydro-3-(4-pyridyl)-2H-thieno[2,3-g]indazole

Step A: 6,7-dihydro - 3' - (4-pyridyl)-spiro[(1 - benzothiophene)-5-(4H),2'-oxirane] - 4 - one.—A solution of crude 2-bromo - 4 - keto-4,5,6,7-tetrahydrothionaphthene (prepared from 22.8 grams (0.15 mole) of 4 - keto-4,5,6,7-tetrahydrothionaphthene, and 24.0 grams (0.15 mole) of bromine in 100 ml. of ether) and 15.0 grams (0.14 mole) of 4-pyridine-carboxaldehyde in 230 ml. of methanol is blanketed with nitrogen and cooled to an internal temperature of 0° C. A solution of 0.14 mole of sodium methoxide in 20 ml. anhydrous methanol is added dropwise with stirring while maintaining the internal temperature at 0 to 5° C. After stirring at room temperature for about 15 hours, the solution is concentrated in vacuo to about ½ volume. The resultant solid is filtered off to give 6,7 - dihydro-3'-(4-pyridyl)-spiro[1-benzothiophene-5(4H),2'-oxirane]-4-one (M.P. 186–188°).

Following the above procedure, but using an equivalent amount of p-chlorobenzaldehyde in place of the 4-pyridine-carboxaldehyde, there is obtained 6,7-dihydro-3'-(p-chlorophenyl) - spiro[1 - benzothiophene - 5(4H),2'-oxirane]-4-one.

When the process of this example is carried out using 4,5,6,7-tetrahydro-benzofurane in place of the 4,5,6,7-tetrahydrothionaphthene, there is obtained 6,7-dihydro-3'-(4-pyridyl)-spiro[1-benzofurane - 5(4H),2' - oxirane]-4-one with 4-pyridine-carboxaldehyde and 6, 7-dihydro-3'-(p-chlorophenyl) - spiro[1-benzofurane - 5 (4H), 2'-oxirane]-4-one with p-chlorobenzaldehyde.

Step B: 4,5-dihydro-3-(4-pyridyl)-2H-thieno[2,3-g]indazole.—To a solution of 60 ml. of dioxane and 12.8 grams (0.20 mole) of acetic acid cooled in an icebath there is added dropwise with stirring 6.4 grams (0.20 mole) of 97% hydrazine. The temperature is maintained below 30° during the addition. To the resultant mixture, is added a solution of 10.3 grams (0.04 mole) of 6,7-dihydro-3'-(4-pyridyl) - spiro[1-benzothiophene-5(4H),2'-oxirane]-4-one in 50 ml. ethanol; and the entire mixture is refluxed and stirred for 12 hours. The solvent is removed in vacuo and the residue crystallized from ethanol to give 4,5-dihydro-3-(4-pyridyl)-2H-thieno[2,3 - g]indazole (M.P. 216–219°).

The 4,5 - dihydro - 3-(4-pyridyl)-2H-thieno[2,3-g]indazole of this example is an effective fertility control agent when it is subcutaneously administered to an animal at a dosage of 50 milligrams four times a day.

When the above process is carried out using an equivalent amount of (a) 6,7-dihydro - 3' - (p-chlorophenyl) - spiro[1 - benzothiophene-5(4H), 2'-oxirane]-4-one,
(b) 6,7 - dihydro - 3' - (4-pyridyl)-spiro[1-benzofurane-5(4H),2'-oxirane]-4-one-or
(c) 6,7 - dihydro - 3' - (p-chlorophenyl)-spiro[1-benzofurane-5(4H), 2'-oxirane]-4-one in place of the 6,7-dihydro - 3'-(4-pyridyl)-spiro[benzothiophene-5(4H),2'-oxirane]-4-one used therein there is obtained (a) 4,5-dihydro-3-(p-chlorophenyl)-2H - thieno[2,3 - g] indazole, (b) 4,5-dihydro-3-(4-pyridyl)-2H - furano[2,3 - g]indazole or (c) 4,5-dihydro - 3 - (p-chlorophenyl)-2H-furano[2,3-g]indazole respectively.

EXAMPLE 2

4,5-dihydro-3-(4-pyridyl)-2H-thieno[2,3-g]indazole

A solution of 64.26 grams of 4-pyridine carboxaldehyde, 89.12 grams 4 - keto - 4,5-6,7 - tetrahydrothionaphthene, 10 grams of piperidine and 10 grams of acetic acid are maintained at 60–70° for 2 hours and at 80° for 15 hours. The solution is cooled in an ice-bath and treated with about 200 ml. of acetone-pentane (1:1). The resultant precipitate is filtered off and the filtrate is stored in a refrigerator for about 24 hours. The resultant solid is filtered off to give 6,7-dihydro-5-(4-pyridylmethylene) 1-benzothionaphthen-4-one.

A mixture of 8.0 grams of 6,7-dihydro-5(4-pyridylmethylene) - 1 - benzothionaphen - 4 - one, 3.2 grams (0.10 mole) of 97% hydrazine and 75 ml. of ethanol is stirred and refluxed for 20 hours. The solvent is removed in vacuo, and the residue, 3-(4-pyridyl) - 3,3a,4,5-tetrahydro - 2H - thieno[2,3-g]indazole is dissolved in chloroform and chromatographed on silica gel. The resulting 4,5-dihydro - 3 - (4-pyridyl)-2H-thieno[2,3-g]indazole is eluted with 90:10 CHCl₃:CH₃OH solvent and has a melting point of 216–219° C. from ethanol.

Following the above procedure but using an equivalent amount of 4-keto-4,5,6,7-tetrahydrobenzofurane in place of the 4-keto-4,5,6,7-tetrahydrothionaphthene, there is obtained 4,5-dihydro - 3-(4-pyridyl) - 2H-furano[2,3-g]indazole.

EXAMPLE 3

4,5-dihydro-3-(4-pyridyl)-2H-thieno[2,3-g]indazole

A solution of 12.5 grams of 5-isonicotinoyl - 4-heto-4,5,6,7-tetrahydrothionaphthene and 2 grams of hydrazine in 50 milliliters of ethanol is refluxed for 1 hour. The solution is then acidified with 100 milliliters of 1 N hydrochloric acid and extracted twice with 100 milliliters of methylene chloride. The aqueous solution is then made basic with sodium bicarbonate and extracted again with methylene chloride. The latter extracts are washed with water, dried and concentrated under vacuum. The 4,5-dihydro - 3 - (4 - pyridyl) - 2H-thieno[2,3-g]indazole which precipitates is recrystallized from ethanol (M.P. 216-219° C.).

When the above process is repeated using an equivalent amount of 5-isonicotinoyl - 4 - heto - 4,5,7 - tetrahydrobenzofurane in place of the 5-isonicotinoyl - 4 - heto-4,5,6,7-tetrahydrothionaphthene, there is obtained 4,5-dihydro-3-(4-pyridyl)-2H-furano[2,3-g]indazole.

EXAMPLE 4

4,5-dihydro-3-(4-pyridyl)-2H-thieno[2,3-g]indazole

To a mixture of 10 g. of 6,7-dihydro-5-(4-pyridylmethylene)-benzothionaphthen-4-one in 100 ml. of water and 200 ml. of ethanol is added sufficient chloroform to dissolve the reactants. The pH is adjusted to between 7 and 9 and a 3 molar excess of 30% hydrogen peroxide in water is added dropwise at room temperature. The reactants are stirred for 5 hours after which sufficient ferrous sulfate is added to neutralize the excess peroxide. The mixture is then acidified with hydrochloric acid and the organic solvent evaporated off. The water solution remaining is made basic and extracted with chloroform. The chloroform is evaporated off yielding 6,7-dihydro-3'-(4-pyridyl)-spiro[1 - benzothiophene - 5(4H),2'-oxirane]-4-one.

Following the procedure of step B of Example 1, the above 6,7-dihydro-3'-(4-pyridyl)-spiro[1-benzothiophene-5(4H),2'-oxirane]-4-one is treated with hydrazine to yield 4,5-dihydro-3-(4-pyridyl)-2H-thieno[2,3-g]indazole.

In a similar manner, replacing the 6,7-dihydro-5-(4-pyridylmethylene)-benzothionaphthen - 4 - one with an equivalent amount of 6,7-dihydro-5-(4-pyridylmethylene)-benzofuran-4-one in the process of this example, there is obtained after carrying out the procedure of step B of example 1, 4,5-dihydro-3-(4-pyridyl) - 2H - furano[2,3-g]indazole.

EXAMPLE 5

4,5-dihydro-3-(4-pyridyl)-2H-thieno[2,3-g]indazole

Into a flask equipped with a magnetic stirring bar is charged 5.0 grams of 3-(4-pyridyl)-3,3a,4,5-tetrahydro-2H-thieno[2,3-g]indazole, prepared as in example 2, 25 grams of activated manganese dioxide and 150 ml. of dry benzene. The mixture is stirred for about 12 hours at room temperature, after which the manganese salts are filtered off and the solvent removed in vacuo. The solid is crystallized from ethanol to give 4,5-dihydro-3-(4-pyridyl)-2H-thieno[2,3-g]indazole.

Following the above procedure but using an equivalent amount of 3-(4-pyridyl)-3,3a,4,5-tetrahydro - 2H - furano[2,3-g]indazole prepared by the process of example 2 in place of the 3-(4-pyridyl)-3,3a,4,5-tetrahydro-2H-thieno[2,3-g]indazole used therein, there is obtained 4,5-dihydro-3-(4-pyridyl)-2H-furano[2,3-g]indazole.

What is claimed is:
1. A compound of the formula

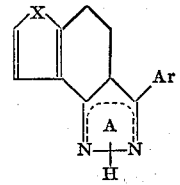

where ring A represents the structures

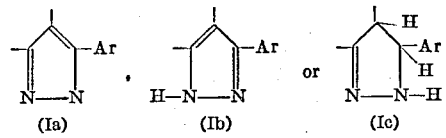

X is S and Ar is

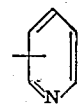

or a pharmaceutically acceptable acid addition salt thereof.

2. The compound of claim 1 in which ring A has the structure (Ia) or (Ib) and Ar is 4-pyridyl.
3. The compound of claim 1 in which X is S.
4. The compound of claim 2 which is 4,5-dihydro-3-(4-pyridyl)-2H-thieno[2,3-g]indazole.

References Cited

UNITED STATES PATENTS 3,235,564   2/1966   Wagner _____ 260—310 R
3,624,102   11/1971  Brown et al. _____ 260—310 R ALAN L. ROTMAN, Primary Examiner U.S. Cl. X.R.

260—294.8 C, 296 T, 297 B, 310 R, 332.3 P, 346.2; 424—263, 269